United States Patent
De Miguel Valiente

(10) Patent No.: US 12,214,226 B2
(45) Date of Patent: Feb. 4, 2025

(54) SELF-BRAKING DESCENDER FOR ROPE WITH LEVER ACTUATION

(71) Applicant: PROTECTTION PROTECCION TECNICA, S.L., Getxo (ES)

(72) Inventor: Pablo Luis De Miguel Valiente, Getxo (ES)

(73) Assignee: Protecttion Proteccion Tecnica, S.L., Getxo (ES)

( * ) Notice: Subject to any disclaimer, the term of this patent is extended or adjusted under 35 U.S.C. 154(b) by 0 days.

(21) Appl. No.: 18/727,098

(22) PCT Filed: Mar. 1, 2023

(86) PCT No.: PCT/ES2023/070114
§ 371 (c)(1),
(2) Date: Jul. 7, 2024

(87) PCT Pub. No.: WO2023/175209
PCT Pub. Date: Sep. 21, 2023

(65) Prior Publication Data
US 2024/0424322 A1 Dec. 26, 2024

(30) Foreign Application Priority Data
Mar. 15, 2022 (ES) .................................. 202230213

(51) Int. Cl.
*A62B 1/14* (2006.01)
*F16D 63/00* (2006.01)
(52) U.S. Cl.
CPC .............. *A62B 1/14* (2013.01); *F16D 63/008* (2013.01)

(58) Field of Classification Search
CPC ................................ A62B 1/14; F16D 63/008
(Continued)

(56) References Cited

U.S. PATENT DOCUMENTS

2011/0048852 A1   3/2011   Wolf et al.
2012/0103725 A1*  5/2012   Johansson ................ A62B 1/14
                                                                     182/5
(Continued)

FOREIGN PATENT DOCUMENTS

EP    2711054 A1   3/2014
EP    3056248 A1   8/2016

OTHER PUBLICATIONS

International Search Report for PCT/ES2023/070114, Apr. 4, 2023, 7 pgs.
(Continued)

*Primary Examiner* — Xuan Lan Nguyen
(74) *Attorney, Agent, or Firm* — Danielson Legal LLC

(57) ABSTRACT

The invention consists of uncoupling the actuation lever (6) of the device from the main body thereof, such that the same ceases to be integral and becomes pivotable by means of a rotation axis (7), such that it is connected to the head (2) by means of a transmission that reduces the force required to actuate the lever, as well as varies the range of angles in which the lever is effective, thereby making the use of the device easier, more comfortable and more accurate. The device has means for uncoupling the transmission between the lever and the head, surpassing a degree of inclination for the main body that can be dangerous, a mechanism that can be disabled by means of a pin passing through a hole (10) made in the lever (6).

6 Claims, 5 Drawing Sheets

(58) Field of Classification Search
USPC .......................................................... 188/65.4
See application file for complete search history.

(56) References Cited

U.S. PATENT DOCUMENTS

2012/0261212 A1   10/2012  Bonaiti
2016/0228730 A1*  8/2016  Chaumontet ............ A62B 1/14

OTHER PUBLICATIONS

Search report for Spanish Patent Appl. No. P202230213, Apr. 1, 2022, 4 pgs.
Written Opinion for PCT/ES2023/070114, Sep. 21, 2023, 4 pgs.

* cited by examiner

SELF-BRAKING DESCENDER FOR ROPE WITH LEVER ACTUATION

CROSS REFERENCE TO RELATED APPLICATIONS

The present application is the U.S. national phase application of, and claims the benefit of and priority to, International (PCT) Patent Appl. No. PCT/ES2023/070114, filed internationally on Mar. 1, 2023, which itself claims priority to Spanish Patent Appl. P202230213, filed on Mar. 15, 2022. The entire disclosure of each of these applications is incorporated by reference as if set forth in their entirety herein.

TECHNICAL FIELD

The present invention relates to a self-braking descender for rope with activation by lever-head interaction, in which the activation of the lever causes the unlocking of the rope due to the rotation of the main body of the device with respect to the direction of the pull, of the rope in tension.

The object of the invention is to provide a self-braking descending device in which the manoeuvre to regulate the degree of release of the rope is much simpler, more comfortable and more precise.

It is also the object of the invention to provide a device that includes means that can be disabled, which prevent exceeding a degree of release of the rope above which the descent speed could become dangerous for untrained personnel.

The invention is therefore placed in the field of descent safety devices using ropes or rappelling.

BACKGROUND OF THE INVENTION

In the scope of practical application of the invention, self-braking descending devices are known, made up of a main body obtained from two parallel plates between which a pair of axles are arranged through which a rope is passed, causing it to change direction several times.

The main body is connected to a tilting head by way of a ring, through which it is connected to the user's harness or safety equipment, while a lever is integral with said body, the pulling of which causes the main body to rotate with respect to the head and therefore the relative position of the rope with respect thereto also changes, reducing the degree of friction of the rope within the main body and therefore allowing a controlled descent by the user.

The problem with this type of device is that the lever is solidly attached to the main body, which generates a twofold problem:

On the one hand, actuating the lever requires considerable effort, to which it must be added the fact that the point at which the rope begins to be released is very specific, coinciding with an exact inclination of the lever, which being solidly attached to the main body, offers very small margins of maneuverability.

The fact that the lever is solidly attached to the main body of the device makes it relatively easy to exceed a point or degree of release of the rope at which it stops being braked with the consequent risk of accident in a panic situation in which the user gets into a mental block and does not stop actuating the lever.

DESCRIPTION OF THE INVENTION

The self-braking descender for rope with actuation by lever-head interaction that the invention proposes fully satisfactorily solves the problem previously explained in each and every one of the aspects mentioned, based on a simple but extremely effective solution.

To this end, and more specifically, it has been provided that the lever that controls the relative angular position of the main body of the device, instead of being solidly attached to said body, is tiltable with respect thereto, so that said lever is connected to a transmission mechanism that connects the head with the lever and therefore the relative angular position of the main body of the device.

This transmission can be embodied in very different manners, either through complementary teeth established both in the head and in the lever, crown pinion transmissions, etc.

By being able to choose the transmission ratio between these elements, the device can be designed with different degrees of multiplication of the effect of the lever on the head, which allows reducing the effort for actuating the lever, as well as varying the margin or range of angles of the lever at which it releases the rope, therefore offering greater precision when controlling the degree of release of the rope.

In accordance with another of the features of the invention, it has been foreseen that the transmission between head and lever is interrupted once a pre-established lever actuation angle has been exceeded, beyond which the degree of release of the rope may become dangerous, so that the main body never exceeds a pre-established inclination.

This objective can be achieved with an appropriate design of the teeth that relate the head and lever, so that once the safety angle has been crossed they stop coming into contact with each other, or simply removing a toothed sector of the transmission pinion/crown that connects both elements.

This structuring therefore defines an "anti-panic" mechanism that prevents excessive release of the rope that could be dangerous for untrained personnel.

Nevertheless, it has been foreseen that this mechanism can be easily disabled, by including in the lever a hole through which a pin or bolt can be passed, which, when the lever is actuated and a certain actuation angle thereof is crossed, lower than the angle of disconnection of the lever from the head, said pin comes into contact with the main body and consequently acts directly on the same, just as if the lever were solidly attached to the main body.

This solution is of interest to qualified and trained personnel who require quick action manoeuvres, as well as when helping a person who is suspended with a mechanism of the same type to descend in parallel.

Lastly, it only remains to be noted that, as a safety protocol during descents, the lower part of the rope must always be held while descending.

Well, the special arrangement of the internal axles and configuration of the main body and arrangement of the head allow the transmission mechanism connecting the head with the lever to be configured such that for them to engage and the device to operate, the user must be forced to exert some tension on the bottom of the rope to unlock the device and begin the descent.

For this function, starting from a suspension position, and with a design that in that suspension position does not provide lever-head gear, if the free rope is held with a certain tension, this tension in the free rope causes the body to perform a small rotation placing the head-lever transmission elements in a contact position, allowing the rope to be unlocked from that moment on.

Consequently, based on this structure, the device of the invention makes it possible to offer the following advantages and features:

Allows increasing/decreasing the rotation of the body with respect to the rotation of the lever (multiply the moment of force on the lever).

Allows varying (increasing/decreasing) the rotation of the lever to release the rope depending on the position of the lever according to the geometry of the teeth/cams that interact, with the possibility that in some positions the lever has a rotation ratio with respect to the head, and in other positions it has a different one.

Decrease in the force required on the lever to rotate the body.

More precise control over the rotation of the descender's body and the possibility of this control being greater in strategic positions.

Allows designing the device by choosing the angles and range of movement in which the lever rests on the head.

Allows establishing a gear point from which the lever begins to rest on the head and, therefore, makes the body rotate.

Allows establishing a disengagement point from which the lever stops resting on the head and therefore the body returns to its initial position.

Allows a new safety function for this type of equipment (free rope lock) that prevents a user from starting the descent by activating the lever if the user has not previously controlled the free descent rope.

DESCRIPTION OF THE DRAWINGS

As a complement to the description that will be provided herein, and for the purpose of helping to make the features of the invention more readily understandable, according to a preferred practical exemplary embodiment thereof, said description is accompanied by a set of drawings constituting an integral part thereof in which, by way of illustration and not limitation, the following is represented:

FIG. 4 shows a view similar to that of FIG. 3, but corresponding to an instant after pulling the lower end of the rope, which causes the body to make a small turn by placing the head-lever transmission elements in a contact position, allowing the rope to be unlocked from that moment on.

PREFERRED EMBODIMENT OF THE INVENTION

In view of the figures outlined, it can be seen how the device of the invention is constituted from a main body (1) in which two parallel plates are involved with their corresponding spacers (9), a body to which a head (2) is connected by means of a joint (5).

The head (2) has a ring-like configuration, to which the user's harness or safety equipment is intended to be attached by means of the complementary snap hook or safety element in question.

Figure 3:
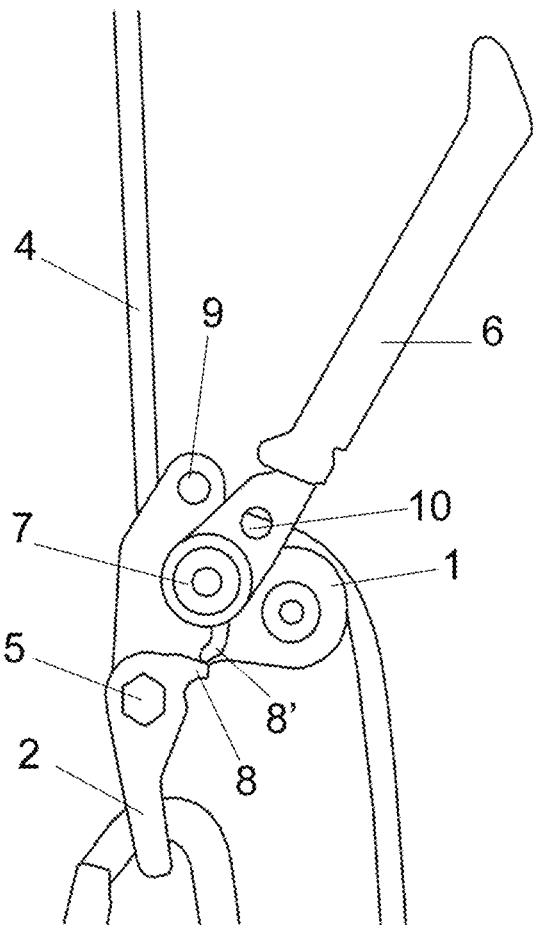
FIG. 3 shows a view similar to that of FIG. 1, but corresponding to a variant embodiment in which initially the transmission between the lever and the head is not engaged, so that, to make the device operative, it is necessary to exert certain tension on the lower end of the rope.

Between the plates of the main body (1) there is a pair of axles (3-3') through which the safety rope (4) is passed, as shown in FIG. 3, so that in the situation of suspension of the user at the head (2), the rope tends to self-strangulate between said axles, preventing its movement.

Figure 1:
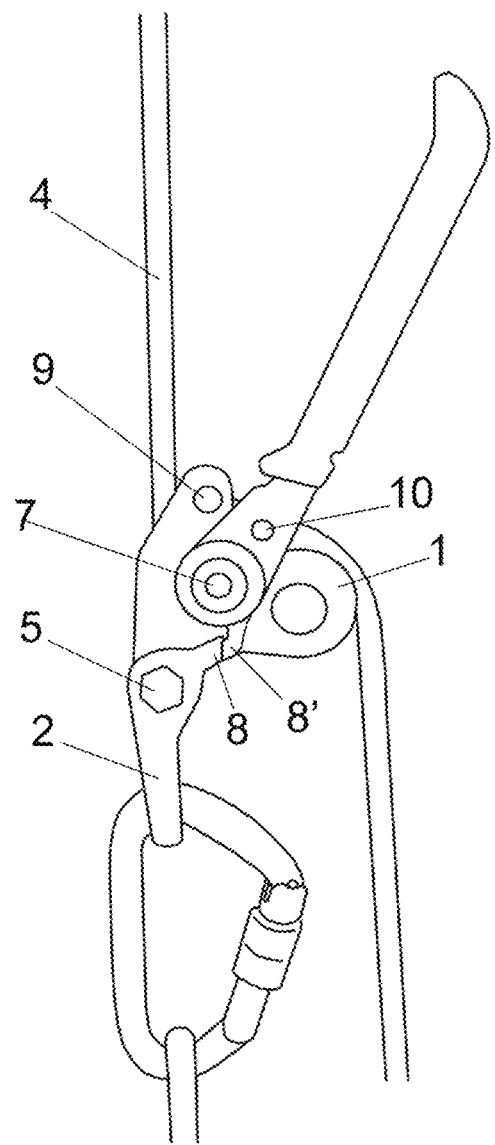
FIG. 1 shows a side elevation view of a self-braking descender for rope actuated by lever-head interaction made in accordance with the object of the present invention in its initial assembly position, in which the lever is inoperative.
Figure 2:
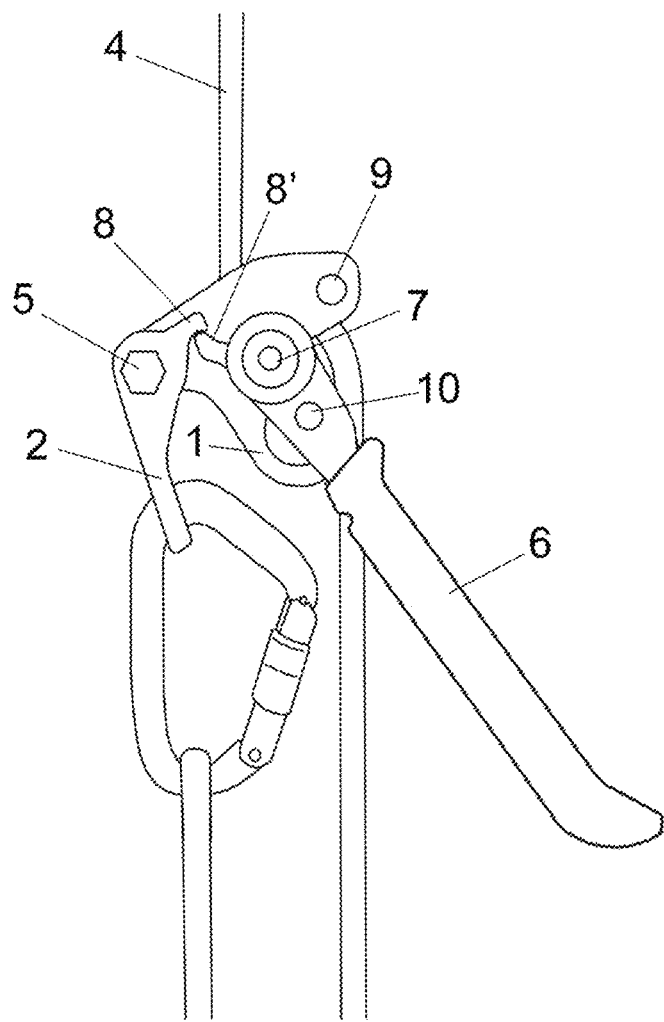
FIG. 2 shows a view similar to that of FIG. 1, but corresponding to the limit release position of the rope.

Well, in accordance with the essence of the invention, and as can be seen in FIGS. 1 and 2, it has been provided that a lever (6) with an axis of rotation (7) is connected to the main body, which is related to the head (2) by means of a transmission, in the exemplary embodiment chosen from complementary teeth (8-8') established respectively in the head (2) and the lever (6), although it could include more than one tooth per element, by way of a pinion-crown transmission.

This allows designing the device by choosing the transmission ratio between these elements, and therefore choosing a multiplying factor depending on the radius of rotation of the teeth and the distance between the head and lever articulation points, so that, for example, to rotate the body 15° with respect to the head we have to rotate the lever 30°, which gives the user a greater control in managing the unlocking and less effort to perform said manoeuvre.

As can be seen in FIG. 2, the transmission between lever (6) and head (2) will have a limit point, which coincides with that which is represented in said FIG. 2, from which the tooth (8) stops being in contact with the tooth (8'), so that beyond said point the lever (6) stops being operative.

Figure 6:
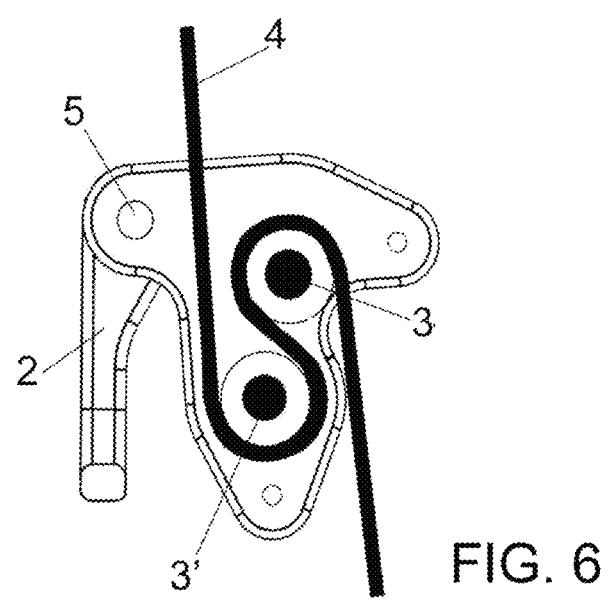
FIG. 6 shows a view similar to that of FIG. 5, but corresponding to a position of relative inclination between the main body and the head that exceeds the "anti-panic" point, i.e., in a position in which the rope is completely released, with the consequent risk that this may entail, a position that cannot be reached using the "anti-panic" system that includes the device of the invention, unless said system is disabled.

This ensures that the main body at no time exceeds an inclination that could excessively release the rope, a situation that is represented in FIG. 6.

The device can be easily reassembled by rotating the lever in the opposite direction to the direction of actuation, re-engaging the teeth (8-8') and becoming perfectly operative again.

As previously described, this "anti-panic" system can be easily disabled in those situations where it is required, for which, and as can be seen in FIG. 1, the lever (6) includes a hole (10) through which a pin or bolt can be passed that will thread on said hole (10) and that, when the lever is actuated and a certain actuation angle thereof is crossed, lower than the angle of disconnection of the lever from the head, said pin comes into contact with the main body and consequently acts directly on the same, just as if the lever were solidly attached to the main body.

Figure 4:
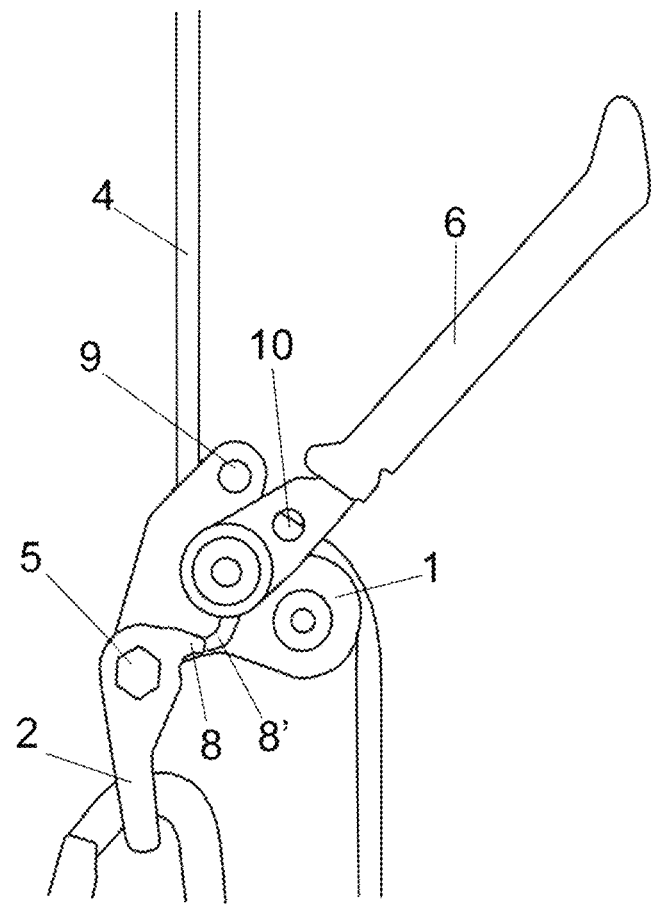
Figure 5:
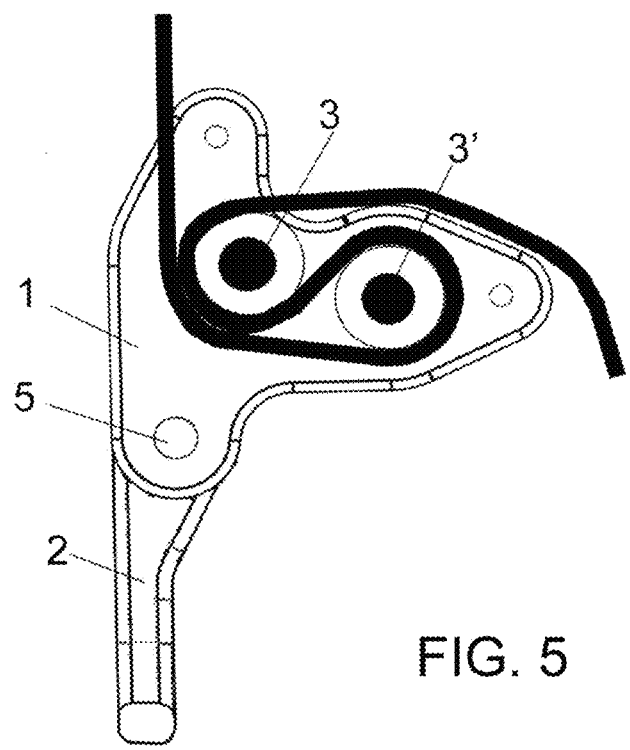
FIG. 5 shows a cross-sectional detail of the device of the invention at the level of its main body, on which the safety rope appears arranged, in a position in which the same is locked by virtue of the relative angular position between said main body and the head to which it is connected.

Finally, it only remains to point out that, according to the variant embodiment of FIGS. 3 and 4, by varying the shapes and sizes of the teeth, or varying the angle formed by the tooth (8')—joint (5) assembly with respect to the longitudinal axis of the head (2), a starting situation can be obtained in which the teeth (8-8') do not engage with each other, as shown in FIG. 3, which means that for the device to work the user is forced to exert a certain tension on the lower portion of the rope (4), since in the initial suspension position if the main body is too prone, there will be no contact between the teeth (8-8'), so that, when assembling the device, the free rope must be fastened with a certain tension, a tension that causes the body to make a small rotation, placing the head-lever transmission elements in a contact position, allowing unlocking of the rope from that moment on.

In this way, a disconnection area is defined between the head (2) and lever (6) prior to a pre-established minimum degree of inclination of the main body (1), which is reached by the required pulling of the rope.

The invention claimed is:

1. A self-braking descender for rope with lever actuation, which is of the type made up of a main body (1) in which two parallel plates are involved between which a pair of axles (3-3') are arranged through which a safety rope (4) is passed, main body which is connected in an articulated manner to a head (2) by way of a ring, to which the user's harness or safety equipment is intended to be attached, having a lever (6) for actuation and control of the degree of inclination of the main body of the device, is characterised in that the lever (6) is connected in an articulated manner to the main body through an axis of rotation (7) for the same, with the particularity that the lever (6) is related to the head (2) by means of a mechanism with its corresponding transmission ratio.

2. The self-braking descender for rope with lever actuation, according to claim 1, characterised in that the transmission mechanism between head (2) and lever (6) is embodied in respective complementary teeth (8-8') respectively established in the head (2) and the lever (6).

3. The self-braking descender for rope with lever actuation, according to claim 1, characterised in that the transmission mechanism between head (2) and lever (6) is embodied in a pinion-crown type mechanism.

4. The self-braking descender for rope with lever actuation, according to claim 1, characterised in that the transmission mechanism between head (2) and lever (6) includes a disconnection area between the head (2) and lever (6) beyond a pre-established inclination degree of the main body.

5. The self-braking descender for rope with lever actuation, according to claim 1, characterised in that the lever (6) includes a hole (10) through which a pin or bolt that threads on said hole (10) can be passed and which in the actuation manoeuvres of the lever (6) comes into contact with the main body of the descender beyond a pre-established angle.

6. The self-braking descender for rope with lever actuation, according to claim 1, characterised in that the transmission mechanism between head (2) and lever (6) includes a disconnection area between the head (2) and lever (6) prior to a pre-established minimum inclination degree of the main body (1).

* * * * *